Patented Apr. 12, 1949

2,467,095

UNITED STATES PATENT OFFICE 2,467,095

ACYLATION WITH ENOL ESTERS

William M. Quattlebaum, Jr., and Charles A. Noffsinger, Charleston, W. Va., assignors to Carbide and Carbon Chemicals Corporation, a corporation of New York No Drawing. Application July 8, 1947, Serial No. 759,692

13 Claims. (Cl. 260—491)

This invention relates to the acylation of aldehydes and ketones, as in the preparation of acetoxybutadiene from crotonaldehyde, and acetoxystyrene from acetophenone.

The acylating agent with which this invention is particularly concerned is the acyl ester of an olefine alcohol having the characteristic structure,

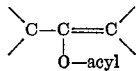

in which the acyloxy group is linked to an unsaturated carbon atom which is in turn linked to two carbon atoms. The alpha, beta olefinic alcohol, itself, wherein the hydroxyl group is attached to an unsaturated carbon atom, may be regarded as the enol form of the isomeric ketone, and the acyl ester may be regarded as the enol ester of a ketone. In the description which follows the expression alpha, beta olefinic alcohol is intended to refer to an unsaturated alcohol in which the hydroxyl group is attached to a carbon atom which is itself linked to another carbon atom by a double bond.

A number of enol esters having the general formula

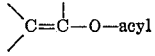

are known, not all of which have been obtainable directly from the aldehyde or ketone whose enol form corresponds to the olefinic alcohol of the ester. For the preparation of certain enol esters it has been proposed to acetylate with acetic anhydride in the presence of sodium acetate catalyst, as for instance in the production of acetoxybutadiene, $CH_2=CHCH=CH-O-acetyl$, from crotonaldehyde and acetic anhydride, in the presence of a large amount of sodium acetate. Separation of acetoxybutadiene from unreacted acetic anhydride is difficult because of the small difference in boiling points, while a separation by hydrolysis results in considerable loss of the anhydride as dilute acetic acid.

This invention is based on our discovery that an aldehyde or ketone containing an active or labile hydrogen atom on the carbon atom adjacent the carbonyl group, or on a carbon atom joined to the carbonyl group by one or more olefinic groups, $>C=C<$, may be converted to the acyl ester of the enol form thereof by reacting such aldehyde or ketone with an acyl ester of an alpha, beta olefinic alcohol. The over-all result of such reaction is that the ester acyl group of the acylating agent is transferred to the compound to be acylated, and the carbonyl compound then becomes esterified in its enol form, while the alpha, beta olefinic alcohol residue of the acylating agent combines with the replaced hydrogen and reverts to the keto form.

The reaction which appears to be of broad applicability may be illustrated for aldehydes containing the group

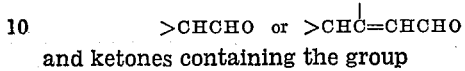

and ketones containing the group

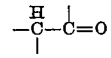

by the following general equations:

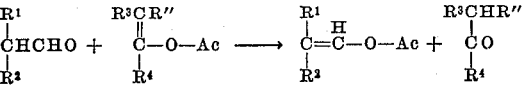

(I)

in which $R''$, $R^1$ and $R^3$ may each be hydrogen, aliphatic, or aromatic; $R^2$ and $R^4$ may each be aliphatic or aromatic; $R^1$ and $R^2$ taken together may be part of a cycloaliphatic ring; $R^3$ and $R^4$ taken together may be part of a cycloaliphatic ring and Ac is an acyl group, either aliphatic or aromatic;

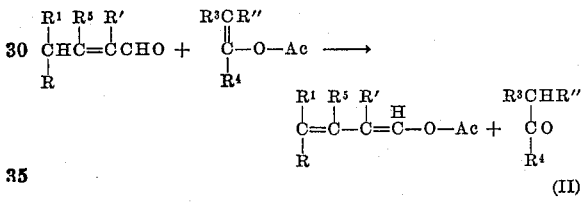

(II)

in which R, R', R'', $R^1$, $R^3$, and $R^5$ may each be hydrogen, aliphatic or aromatic; $R^4$ may be aliphatic or aromatic; $R^3$ and $R^4$ taken together may be part of a cycloaliphatic ring; and Ac is an acyl radical, either aliphatic or aromatic; and

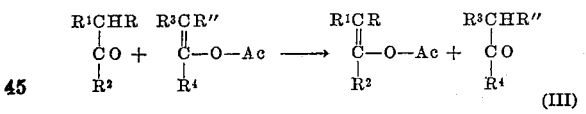

(III)

in which R, R'', $R^1$ and $R^3$ may each be hydrogen, aliphatic, or aromatic; $R^2$ and $R^4$ may each be aliphatic or aromatic; $R^1$ and $R^2$ taken together may be part of a cycloaliphatic ring; $R^3$ and $R^4$ taken together may be part of a cycloaliphatic ring; and Ac is an acyl radical, aliphatic or aromatic. By the term aliphatic it is meant to include cycloaliphatic.

Aldehydes which may be acylated in accordance with the present invention include croton-aldehyde, C₃H₅CHO; ethyl crotonaldehyde, C₅H₁₀CHO, and other 2-substituted crotonaldehydes, having alkyl, aryl or mixed alkylaryl substituents; phenyl acetaldehyde, and the like.

Ketones which may be acylated include acetone, CH₃COCH₃; methyl ethyl ketone, CH₃COC₂H₅; methyl propyl ketones, CH₃COC₃H₇; methyl butyl ketones, CH₃COC₄H₉; methyl pentyl ketones, CH₃COC₅H₁₁; methyl hexyl ketones, CH₃COC₆H₁₃; methyl heptyl ketones, CH₃COC₇H₁₅; methyl octyl ketones, CH₃COC₈H₁₇; methyl nonyl ketones, CH₃COC₉H₁₉; methyl decyl ketones, CH₃COC₁₀H₂₁; diethyl ketone, C₂H₅COC₂H₅; ethyl propyl ketones, C₂H₅COC₃H₇; ethyl butyl ketones,

C₂H₅COC₄H₉ ethyl pentyl ketones, C₂H₅COC₅H₁₁; ethyl hexyl ketones, C₂H₅COC₆H₁₃; ethyl heptyl ketones, C₂H₅COC₇H₁₅; dipropyl ketones, C₃H₇COC₃H₇; propyl butyl ketones, C₃H₇COC₄H₉; propyl pentyl ketones, C₃H₇COC₅H₁₁; propyl hexyl ketones, C₃H₇COC₆H₁₃; dibutyl ketones, C₄H₉COC₄H₉; butyl pentyl ketones, C₄H₉COC₅H₁₁; dipentyl ketones, C₅H₁₁COC₅H₁₁; methyl cyclohexyl ketone, CH₃COC₆H₁₁; ethyl cyclohexyl ketone,

C₂H₅COC₆H₁₁ propyl cyclohexyl ketones, C₃H₇COC₆H₁₁; cyclohexyl acetone, C₆H₁₁CH₂COCH₃; cyclohexanone, C₆H₁₀O; methyl cyclohexanones, CH₃C₆H₉O; ethyl cyclohexanones, C₂H₅C₆H₉O; propyl cyclohexanones, C₃H₇C₆H₉O; butyl cyclohexanones,

C₄H₉C₆H₉O acetophenone, C₆H₅COCH₃; tolyl methyl ketones, CH₃C₆H₄COCH₃; benzyl methyl ketone,

C₆H₅CH₂COCH₃ acetylacetone, CH₃COCH₂COCH₃.

The aldehydes and ketones to be acylated are not necessarily limited to those composed of carbon, hydrogen, and the oxygen of the carbonyl group thereof. They may also contain fluorine, chlorine, nitrogen, sulfur, other oxygen and the like. In acylating an aldehyde or ketone which, in addition to the carbonyl group, has another type of substituent that is preferentially reactive with the enol ester acylating agent, such group may be covered, blocked or protected chemically in known ways before proceeding with the acylating reaction of the present invention. Alternatively, an excess of acylating agent sufficient to react with such group and acylate the carbonyl compound may be used.

As an enol ester acylating agent, there may be used any acyl ester of an alpha, beta olefinic alcohol wherein the unsaturated carbon atom holding the acyloxy group has two carbon atoms linked thereto, as illustrated by the characteristic structure

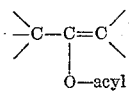

These esters include such enol acylates as the acetates, propionates, butyrates, valerates, hexoates, heptoates, octoates, pelargonates, decanoates, laurates, palmitates, stearates, acrylates, crotonates, angelates, pentenoates, hexenoates, oleates, benzoates, hexahydrobenzoates, maleates, succinates, adipates, pimelates, sebacates, phthalates, phenylacetates, and the like, up to and including twenty carbon atoms to the acyl group. The alcohol group of the acylating agent may correspond, for instance, to the enolic form of any of the above-mentioned ketones.

In carrying out the acylation, the aldehyde or ketone to be acylated may be mixed with the enol ester acylating agent, and the mixture reacted in the presence of a suitable catalyst. In general, the reaction temperature may be from about 0° to 275° C., depending upon the particular compound to be acylated and the acylating agent employed. Within this range the most useful temperatures are from about 50° to 200° C., which are preferred. The reaction may be conducted either in the liquid phase, or in the vapor phase in the presence of an acid catalyst. It may be carried out at normal atmospheric pressure, or at higher or lower pressures, if desired. In carrying out the liquid phase process, the reaction mixture may be heated and maintained at its refluxing temperature for over a period of one to two hours and then distilled.

Starting with acetophenone and acetoxybutene which is one of the acetylating agents listed above, by way of illustration, it will be seen from Equation III that the alpha-phenyl-ethenoxy group,

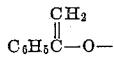

of the enol form of acetophenone will displace the butenoxy group of the acylating agent with consequent formation of acetoxystyrene,

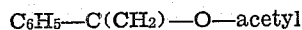

and methyl ethyl ketone, to which the formed butenyl alcohol reverts. Obviously, as the reaction proceeds, the concentrations of the acetophenone and acetoxybutene reactants in the reaction mixture decreases from their initial concentrations while the concentrations of the acetoxystyrene and ethyl methyl ketone products increase from zero, their initial concentrations.

Similarly, starting with methyl ethyl ketone and acetoxystyrene, which is one of the acylating agents listed above, it will be seen from Equation III that the alpha-phenyl-ethenoxy group of the acylating agent will be displaced by the butenoxy group of the enolic form of methyl ethyl ketone, with consequent formation of acetoxybutene and acetophenone. Here, also, as the reaction proceeds, the concentrations of the reactants in the reaction mixture decrease from their initial concentrations while the concentrations of the butenyl acetate (acetoxybutene) and the acetophenone increases from zero, their initial concentrations.

As far as is known, the course of the reaction between ketones and enol esters in the process of the invention does not depart from well-established laws or principles applicable to opposing reactions, dynamic equilibrium and equilibrium concentration, first enunciated as early as 1867 by Guldberg and Waage. The point of equilibrium may be shifted in the direction of the formation of the enol ester product by well-known expedients which constitute no part of the invention, as for instance by increasing the concentration of a reactant or decreasing the concentration of one of the products, as by distillation.

It will be readily apparent that by selecting as the acylating agent an enol ester such that the ketone by-product which is formed has a lower boiling point than the compound being acylated, the lower-boiling ketone may be removed by distillation as it is formed, until a desired degree of conversion is attained. Usually, the more efficient the distillation column the better the results, particularly where the boiling points lie close together. Thereupon the enol ester product may be distilled at reduced pressure.

The reaction may be catalyzed with esterification catalysts including such materials as phosphoric acid, sulfuric acid, sulfoacetic acid, toluene sulfuric acid and the like. The preferred catalysts are sulfuric acid, sulfoacetic acid, and toluene sulfonic acid. The amount of catalyst used may be varied between wide limits. In general, it should not be less than about 0.05 per cent of the total reactants, by weight, and usually it is unnecessary to exceed 5 per cent. Our best results have been obtained with about 0.1 to 1 per cent of concentrated sulfuric acid, by weight. Upon completion of the reaction, we prefer to neutralize the acid catalyst with a tertiary amine, or with sodium acetate to minimize decomposition during the purification step, but it is not essential to do so. For many purposes a separation of the product from the catalyst by distillation under reduced pressure may be found to give satisfactory results. Inasmuch as the purpose of the catalyst is to accelerate the velocity of the reaction between the enol ester and the aldehyde or ketone, it will be apparent that upon destroying the catalyst in the equilibrium mixture resulting from the reaction, a separation of the constituents may be effected, as by distillation, without displacing the position of equilibrium because of removal of one of the reactants or products. Even without destroying the catalyst, however, the position of equilibrium would not be substantially displaced, unless the step of separation is unduly prolonged, relative to the time required for the reaction to attain equilibrium.

Using the foregoing procedure, acylations of compounds may be performed which cannot be carried out satisfactorily using the acid anhydride. For instance, crotonaldehyde may be acetylated rapidly in good yield with isopropenyl acetate, using our preferred method of removing the formed acetone, although only a low yield of acetoxybutadiene is obtainable in the same length of time with acetic anhydride as the acetylating agent in the presence of sodium acetate catalyst. Similarly, cyclohexanone may be acetylated in as high as 90-91 per cent yield, whereas Mannich and Hancu (Berichte 41, 567 (1908)) reported a yield of only 47 per cent upon boiling a mixture of cyclohexanone and acetic anhydride for 50 hours. Also, the acetylation of acetophenone with acetic anhydride proceeds at an extremely low rate, but with isopropenyl acetate it may be completed within an hour or two.

It is not essential to the practice of the invention that the enol ester product be separated from the enol ester acylating agent. Among other uses the acylated product is useful as an intermediate for the production of other compositions, and it may be used in admixture with other materials. For instance, a mixture of the tertiary enol ester reactant and the acylated product may be co-polymerized to form a variety of polymeric substances.

Acylating agents in which the ester-acyl group is other than acetyl may be prepared by reacting an enol acetate of a ketone with a carboxylic acid anhydride having the characteristic structure acyl-O-acyl, and in which the acyl group has more than two carbon atoms. For instance, isopropenyl butyrate and isopropenyl sorbate may be obtained by reacting isopropenyl acetate with butyric anhydride and sorbic anhydride, respectively, using sulfuric acid as the catalyst. Such a process for preparing enol esters by the reaction of an acid anhydride with an enol acylate of a ketone forms no part of the present invention, but is described and claimed in a copending application of Benjamin Phillips, Jr. filed on or about October 5, 1945, Serial No. 620,623.

EXAMPLE 1

1-acetoxy-2- ethyl butadiene-1,3

A mixture containing 294 parts of 2-ethyl crotonaldehyde, $CH_3CH:C(C_2H_5)CHO$, 600 parts of isopropenyl acetate, $CH_2:C(CH_3)OCOCH_3$, and 3 parts of concentrated sulfuric acid, by weight, was boiled for about four hours in a still provided with a column which was 3 feet long and packed with glass helices. Acetone, which is a by-product of the reaction, was removed by distillation until 90 per cent of the theoretical quantity had been obtained. The remaining material was then carefully fractionated. There was obtained 332 parts of 1-acetoxy-2-ethyl butadiene, $CH_2:CHC(C_2H_5):CHOCOCH_3$, and 15 parts of unchanged isopropenyl acetate, representing a yield of 79 per cent, based on the ethyl crotonaldehyde, and an efficiency of 77 per cent, based on isopropenyl acetate consumed. Acetoxy-2-ethyl butadiene was found to be a colorless liquid having the following properties: boiling point, 58° C. at 10 millimeters; $n\ D/30$, 1.4661.

When acetoxybutene, the acetic acid ester of the enol form of methyl ethyl ketone, was substituted for isopropenyl acetate, as the acylating agent, the yield of 1-acetoxy-2-ethyl butadiene was 56 per cent, based on the ethyl crotonaldehyde.

EXAMPLE 2

1-acetoxybutadiene-1,3

A mixture containing 280 parts of crotonaldehyde, $CH_3CH:CHCHO$, 1600 parts of isopropenyl acetate and 2 parts of concentrated sulfuric acid, by weight, was boiled for about 45 minutes in a still provided with a column substantially as described in Example 1. At the end of that time the sulfuric acid which served to catalyze the reaction was neutralized with 18.6 parts of triamylamine. There was obtained 267 parts of acetoxybutadiene, containing a very small amount of acetic anhydride. Unreacted isopropenyl acetate and crotonaldehyde amounting to 1203 parts and 72 parts, respectively, were recovered. The yield and efficiency based on the crotonaldehyde were 60 per cent and 80 per cent, respectively. The efficiency based on the isopropenyl acetate was 60 per cent.

In order to remove the acetic anhydride from the product, it was distilled with steam under reduced pressure. A subsequent distillation under reduced pressure yielded 1-acetoxybutadiene-1,3 having the following properties: boiling point 51.5° C. at a pressure of 30 millimeters; $n\ D/30$, 1.4642.

EXAMPLE 3

1-acetoxybutadiene-1,3

Acetoxybutadiene was prepared using 1.35 parts of phosphoric acid (85 per cent concentration) as the catalyst in a reaction mixture containing 350 parts of crotonaldehyde and 1000 parts of isopropenyl acetate. The procedure was substantially the same as described in Example 2. The amount of acetoxybutadiene obtained was 177 parts, and the amount of unreacted isopropenyl acetate recovered was 498 parts. Based on the crotonaldehyde the yield was 32 per cent and the efficiency, 36 per cent. The efficiency based on isopropenyl acetate was 32 per cent.

EXAMPLE 4

1-acetoxybutadiene-1,3

Using paratoluene sulfonic acid (3.5 parts) as the catalyst, 303 parts acetoxybutadiene were obtained from 350 parts crotonaldehyde and 2000 parts isopropenyl acetate by the same method as was followed in Example 3. The amount of unreacted isopropenyl acetate recovered was 1518 parts. The yield and efficiency based on the crotonaldehyde were 54 per cent and 87 per cent, respectively. The efficiency based on the isopropenyl acetate was 56 per cent.

EXAMPLE 5

1-acetoxy-2-ethylhexene-1

From 256 parts of 2-ethylhexaldehyde and 200 parts isopropenyl acetate there were obtained 90 parts of 1-acetoxy-2-ethylhexene-1. Sulfuric acid (1.4 parts) was used as a catalyst and the reaction was carried out according to the procedure of Example 1. 1-acetoxy-2-ethylhexene-1 ($n$ D/30, 1.4340) was found to be a colorless liquid boiling at 82° C. at a pressure of 10 millimeters. The yield of 1-acetoxy-2-ethylhexene-1 was 31 per cent of the theoretical.

EXAMPLE 6

1-acetoxy-2-ethyl butadiene-1,3

To 456 parts of 2-acetoxybutene prepared according to Example 10, 2 parts of sulfuric acid and 196 parts of 2-ethyl crotonaldehyde were added. The resulting mixture was distilled from a vessel provided with an efficient column about 3 feet long, packed with glass helices. Methyl ethyl ketone, which is a by-product of the reaction, was removed by distillation until about 80 per cent of the theoretical quantity had been obtained. About 4 hours were required. Thereupon, the remainder was distilled rapidly under reduced pressure in order to remove the product from the catalyst, and the condensate thus obtained was redistilled. There was obtained 155 parts of 1-acetoxy-2-ethyl butadiene which was found to be a colorless liquid having the following properties: boiling point, 56°–57° C. at a pressure of 10 millimeters; $n$ D/30, 1.4661. The yield was 56 per cent.

EXAMPLE 7

2-acetoxypentadiene

A mixture containing 451 parts of ethylidene acetone, CH₃CH:CHCOCH₃, 1080 parts of isopropenyl acetate, 2.7 parts of cupric acetate, and 5.4 parts of concentrated sulfuric acid, by weight, was boiled for 3 hours in a still provided with a column 3 feet in length and packed with glass helices. Acetone which was a by-product of the reaction was removed by distillation until about 74 per cent of the theoretical amount had been obtained. Upon careful fractionation of the remaining material, 276 parts of acetoxypentadiene, 720 parts of unreacted isopropenyl acetate and 213 parts of unreacted ethylidene acetone were recovered. The product which may be 2-acetoxypentadiene-1,3 or 2-acetoxypentadiene-2,4, or a mixture of them, was found to have the following properties: boiling point, 64° C. at a pressure of 20 millimeters; $n$ D/30, 1.4551. The yield was 40 per cent and the efficiency 76 per cent, based on ethylidene acetone. Based on isopropenyl acetate, the efficiency was 52 per cent.

EXAMPLE 8

Cyclohexenyl acetate

A mixture of cyclohexanone (294 parts), isopropenyl acetate (600 parts) and sulfuric acid (6 parts) was found to react smoothly to give cyclohexenyl acetate in 91 per cent yield, based on the cyclohexanone. The reaction was carried out substantially as described in Example 6. The amount of cyclohexenyl acetate obtained was 381 parts and the amount of unreacted isopropenyl acetate recovered was 248 parts. The efficiencies were 91 and 77 per cent based on the cyclohexanone and the isopropenyl acetate respectively. Cyclohexenyl acetate was found to be a colorless liquid having the following properties: boiling point, 78° C. at a pressure of 20 millimeters; $n$ D/30, 1.4530.

EXAMPLE 9

Alpha-acetoxystyrene

From 360 parts of acetophenone and 600 parts isopropenyl acetate, there were obtained 251 parts of alpha-acetoxystyrene. Sulfuric acid (3 parts) was used as a catalyst for the reaction which was carried out substantially according to the procedure of Example 5. The alpha-acetoxystyrene ($n$ D/30, 1.5282) was obtained as a colorless liquid boiling at a temperature of 106° C. at a pressure of 10 millimeters. The yield was 52 per cent and the efficiency 90 per cent, based on the acetophenone. There was also recovered 333 parts of unreacted isopropenyl acetate for an efficiency, based on the acetate, of 58 per cent.

EXAMPLE 10

Acetoxybutene

The enol acetates of methyl ethyl ketone were obtained by the reaction of the ketone (1440 parts) with isopropenyl acetate (2000 parts). The reaction was carried out according to a procedure similar to that of Example 6 using sulfuric acid (6.8 parts) as the catalyst. The amount of resulting product obtained upon separation and distillation was 954 parts. It was found to be a colorless liquid which distilled at 119° to 122° C. at normal atmospheric pressure and had a refractive index at 30° C. ranging from 1.4056 to 1.4064. It was a mixture of the isomers, 2-acetoxybutene-1 and 2-acetoxybutene-2. The yield was 42 per cent. There was recovered 642 parts of unreacted methyl ethyl ketone and 936 parts of unreacted isopropenyl acetate, corresponding to efficiencies of 75 per cent and 79 per cent, respectively.

EXAMPLE 11

2-acetoxyisoprene

From a reaction mixture containing methyl isopropenyl ketone and isopropenyl acetate in the proportion of 1 mol of the ketone to 4 mols of the acetylating agent, 2-acetoxyisoprene was obtained in a yield of 45 per cent. 2-acetoxyisoprene CH₂:C(OCOCH₃)C(CH₃):CH₂ was found to be a colorless liquid with the following properties: boiling point, 45° C. at a pressure of 10 millimeters; $n$ D/30, 1.4491. It polymerized rapidly when it was allowed to stand at room temperatures.

EXAMPLE 12

2-keto-4-acetoxy pentene-3

A reaction mixture containing 194 parts of acetylacetone, 776 parts of isopropenyl acetate, and 1 part of sulfuric acid, was boiled in a still provided with an efficient column which was 3 feet high and packed with glass helices. Acetone, a by-product of the reaction, was removed by distillation until about 89 per cent of the theoretical amount of acetone was obtained as a distillate. About 2 hours were required. The reaction mixture was then neutralized with triamylamine and the product isolated by distillation under reduced pressure. There was obtained 179 parts of 2-keto-4-acetoxypentene-3 which was found to be a colorless liquid having the following properties: boiling point, 69° C. at a pressure of 5 millimeters; $n$ D/30, 1.4477. The yield and efficiency were 65 per cent and 95 per cent respectively, based on the acetylacetone. There was also recovered 546 parts of isopropenyl acetate for an efficiency of 55 per cent, based on the acylating agent.

EXAMPLE 13

To 216 parts of methyl ethyl ketone was added 166 parts of alpha-acetoxystyrene,

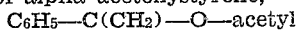

and 0.83 part of concentrated sulfuric acid, by weight, and the mixture heated at its refluxing temperature for a period of two hours during which time the temperature of the boiling liquid rose from 92° C. to 98° C. The sulfuric acid catalyst was then neutralized with 1.45 parts of sodium acetate, by weight. Upon distilling this neutralized mixture at reduced pressure there was obtained 79 parts of acetoxybutene having a refractive index ($n$ D/30) of 1.4064 and having a boiling temperature of 80° C. at a pressure of 50 millimeters of mercury, absolute. The yield of acetoxybutene thus obtained was 67 per cent of theory. There was additionally recovered from the neutralized mixture 165 parts of unchanged methyl ethyl ketone (B. P. about 80° C.), 91 parts of acetophenone (B. P. 202° C.) and 10 parts of undistilled residue. The efficiency based on the acetoxystyrene was 69 per cent and the efficiency based on the methyl ethyl ketone was 97 per cent.

The process is susceptible of modification within the scope of the appended claims.

This application is in part a continuation of our application filed on or about June 6, 1944, Serial No. 539,025, now abandoned.

The process for making 1-acyloxy-1,3-dienes is described and claimed in our copending application filed on or about June 6, 1944, Serial No. 539,024.

We claim:

1. A process for making an enol acetate of a ketone having at least four carbon atoms to the ketone molecule and at least one aliphatic carbon atom having a labile hydrogen atom attached thereto adjacent the carbonyl group thereof, which comprises forming a reaction mixture containing such a ketone to be acetylated and isopropenyl acetate as the acetylating agent, and heating said mixture at its reaction temperature in the presence of an acidic esterification catalyst of the group consisting of sulfuric acid and sulfoacetic acid.

2. A process for making an enol ester of a ketone having at least four carbon atoms to the ketone molecule and at least one active hydrogen atom attached to an aliphatic carbon atom adjacent the carbonyl group thereof which comprises forming a reaction mixture containing such a ketone to be acylated and an acylating agent which is a carboxylic acid ester of the enol form of a different ketone than said ketone to be acylated, and allowing said mixture to react in the presence of an esterification catalyst.

3. A process for making an enol ester of a ketone having at least four carbon atoms to the ketone molecule and at least one active hydrogen atom attached to an aliphatic carbon atom adjacent the carbonyl group thereof which comprises forming a reaction mixture containing such a ketone to be acylated and an acylating agent which is a carboxylic acid ester of the enol form of a different ketone than said ketone to be acylated, and reacting said mixture at a temperature of about 0° to 275° C. in the presence of an esterification catalyst.

4. A process for making an enol ester of a ketone having at least four carbon atoms to the ketone molecule and at least one active hydrogen atom attached to an aliphatic carbon atom adjacent the carbonyl group thereof which comprises forming a reaction mixture containing such a ketone to be acylated and an acylating agent which is a carboxylic acid ester of the enol form of a different ketone than said ketone to be acylated, and heating said mixture at a temperature of about 90° to 200° C. in the presence of an esterification catalyst.

5. A process for making an enol ester of a ketone having at least four carbon atoms to the ketone molecule and at least one active hydrogen atom attached to an aliphatic carbon atom adjacent the carbonyl group thereof which comprises forming a reaction mixture containing such a ketone to be acylated and an acylating agent which is a carboxylic acid ester of the enol form of a different ketone than said ketone to be acylated, and reacting said mixture in the presence of a small amount of concentrated sulfuric acid.

6. A process for making an enol ester of a dialkyl ketone of at least four carbon atoms to the molecule and having a methyl group attached to the carbonyl group thereof which comprises forming a reaction mixture containing such a ketone and an acylating agent which is a carboxylic acid ester of the enol form of a ketone having a lower boiling point than the ketone to be acylated, and heating said mixture in the liquid phase to its refluxing temperature in the presence of an esterification catalyst and distilling the lower boiling ketone therefrom.

7. A process for making an enol ester of a ketone having at least four carbon atoms to the ketone molecule and at least one hydrogen atom attached to an aliphatic carbon atom adjacent the carbonyl group thereof, which comprises forming a reaction mixture containing such a ketone to be acylated and an acylating agent which is an aromatic carboxylic acid ester of the enol form of a different ketone than the ketone to be acylated, and heating said mixture to a temperature of about 75° to 275° C. in the presence of an esterification catalyst.

8. A process for making an enol ester of a ketone having at least four carbon atoms to the ketone molecule and at least one hydrogen atom attached to an aliphatic carbon atom adjacent the carbonyl group thereof, which comprises forming a reaction mixture containing such a ketone to be acylated and an acylating agent which is an aliphatic carboxylic acid ester of the enol form of a different ketone than the ketone to be acylated, and heating said mixture to a temperature of about 75° to 275° C. in the presence of an esterification catalyst.

9. A process for making an enol acetate of a ketone having at least four carbon atoms to the ketone molecule and at least one hydrogen atom attached to an aliphatic carbon atom adjacent the carbonyl group thereof, which comprises forming a reaction mixture containing such a ketone to be acetylated and an acetylating agent which is the acetic acid ester of the enol form of a different ketone than the ketone to be acetylated, and heating said mixture to a temperature of about 90° to 200° C. in the presence of an esterification catalyst.

10. A process for making an enol acetate of a ketone having at least four carbon atoms to the ketone molecule and at least one hydrogen atom attached to an aliphatic carbon atom adjacent the carbonyl group thereof, which comprises forming a reaction mixture containing such a ketone to be acetylated and ispropenyl acetate as an acetylating agent, and heating said mixture to its refluxing temperature in the presence of an esterification catalyst.

11. A process for making an enol acetate of a ketone having at least four carbon atoms to the ketone molecule and at least two hydrogen atoms attached to an aliphatic carbon atom adjacent the carbonyl group thereof which comprises forming a reaction mixture containing such a ketone to be acetylated and an excess of isopropenyl acetate as an acetylating agent, and heating the reaction mixture to its refluxing temperature in the presence of an acid catalyst and distilling from the reaction mixture, acetone formed in the reaction.

12. A process for making alpha-acyloxystyrene which comprises forming a reaction mixture containing acetophenone and an acylating agent which is a fatty acid ester of the enol form of acetone, and heating the reaction mixture to its refluxing temperature in the presence of an acidic esterification catalyst and distilling from the reaction mixture acetone formed in the reaction.

13. A process for making an enol ester of a ketone having at least four carbon atoms to the ketone molecule and at least one active hydrogen atom attached to an aliphatic carbon atom adjacent the carbonyl group thereof, which comprises heating said ketone to be acylated with an acylating agent which is a carboxylic acid ester of the enol form of a ketone in which the number of carbon atoms of the ketone molecule is different from that of the first-mentioned ketone, in the presence of an acid esterification catalyst, said ketone to be acylated and said acylating agent being composed of carbon, hydrogen and oxygen with the oxygen in carbon to oxygen to carbon and carbonyl linkage only.

WILLIAM M. QUATTLEBAUM, JR.
CHARLES A. NOFFSINGER.

REFERENCES CITED

The following references are of record in the file of this patent:

UNITED STATES PATENTS

| Number | Name | Date |
| --- | --- | --- |
| 2,332,901 | D'Alelio | Oct. 26, 1943 |